US005705174A

United States Patent [19]
Benoff et al.

[11] Patent Number: 5,705,174
[45] Date of Patent: Jan. 6, 1998

[54] PROCESS FOR THE PREPARATION OF MICROCAPSULE COMPOSITIONS

[75] Inventors: Brian Eric Benoff, Hawthorne, N.J.; Robin William Dexter, Yardley, Pa.

[73] Assignee: American Cyanamid Company, Madison, N.J.

[21] Appl. No.: 482,586

[22] Filed: Jun. 7, 1995

[51] Int. Cl.$^6$ .................................... A01N 25/28
[52] U.S. Cl. .............. 424/408; 424/417; 427/213.31; 427/213.34; 264/4.1; 264/4.33; 264/4.7; 514/963
[58] Field of Search .............. 427/213.31, 213.34; 264/4.1, 4.33, 4.7; 424/405, 408, 417, 489–491; 574/963

[56] References Cited

U.S. PATENT DOCUMENTS

| | | | |
|---|---|---|---|
| 3,577,515 | 5/1971 | Vandegaer | 424/32 |
| 4,280,833 | 7/1981 | Beestman et al. | 71/100 |
| 4,417,916 | 11/1983 | Beestman | 264/4.7 |
| 4,640,709 | 2/1987 | Beestman | 71/100 |
| 4,853,223 | 8/1989 | Graf et al. | 424/405 |
| 5,310,721 | 5/1994 | Lo | 504/116 |
| 5,354,742 | 10/1994 | Deming et al. | 514/117 |

FOREIGN PATENT DOCUMENTS

| | | |
|---|---|---|
| 0 619 073 A2 | 4/1994 | European Pat. Off. |
| 57-103891 | 6/1982 | Japan . |

*Primary Examiner*—Neil S. Levy
*Attorney, Agent, or Firm*—John W. Hogan, Jr.

[57] ABSTRACT

The present invention provides a process for the preparation of microcapsule compositions, methods for using those microcapsule compositions, compositions containing those microcapsule compositions and microcapsules prepared by the process of the present invention.

22 Claims, No Drawings

5,705,174

PROCESS FOR THE PREPARATION OF MICROCAPSULE COMPOSITIONS

BACKGROUND OF THE INVENTION

The preparation of microcapsule compositions by interfacial polymerization is well known in the art (see, for example, U.S. Pat. No. 3,577,515; U.S. Pat. No. 4,280,833 and U.S. Pat. No. 5,310,721). In those patents, microcapsule compositions are prepared in a similar fashion by reacting an emulsion containing various emulsifiers, a first wall forming component, material to be encapusulated and water with a complementary second wall forming component.

The principal difference among those patents is the choice of emulsifiers; U.S. Pat. No. 3,577,515 discloses the use of partially hydrolyzed polyvinyl alcohol, gelatin and methyl cellulose, U.S. Pat. No. 4,280,833 discloses the use of salts of lignin sulfonate, and U.S. Pat. No. 5,310,721 discloses the use of a salt of a partial ester of a styrene-maleic anhydride copolymer.

Although those processes are useful for the preparation of certain microcapsule compositions, there still is a need in the art for a process, which uses a variety of emulsifiers, to prepare microcapsule compositions having high concentrations of active ingredients which do not readily crystallize.

It is therefore an object of the present invention to provide a process for the preparation of stable microcapsule compositions which have high concentrations of active ingredients, do not readily crystallize and may be prepared using a variety of emulsifiers.

It is also an object of the present invention to provide agricultural microcapsule compositions with rapid release of active agent and decreased staining characteristics.

Those and other objects of the present invention will become more apparent from the detailed description thereof set forth below.

SUMMARY OF THE INVENTION

The present invention relates to a process for the preparation of microcapsule compositions which employs a salt or mixture of salts prior to microcapsule formation.

In particular the invention relates to a process for the preparation of a microcapsule composition which comprises:

(a) providing an aqueous solution containing a salt or mixture of salts and an emulsifier or mixture of emulsifiers;

(b) dispersing, with agitation, in the aqueous solution, a salt water-immiscible solution containing a first reactive wall forming component and a salt water-immiscible material to form a dispersion; and (c) adding, with agitation, to the dispersion of steb (b), a second reactive wall forming component which reacts with the first reactive wall forming component to form a polycondensate shell wall about the salt water-immiscible material.

The present invention also relates to the pesticidal use of the microcapsule compositions, pesticidal compositions containing the microcapsule compositions and the microcapsules prepared by the process of the present invention.

DETAILED DESCRIPTION OF THE INVENTION

The present invention provides a process for the preparation of a composition having microcapsules containing a salt water-immiscible material within a shell wall of a polycondensate suspended in an aqueous salt solution, which comprises: providing an aqueous solution containing a salt or mixture of salts and an emulsifier or mixture of emulsifiers; dispersing, with agitation, in the aqueous solution, a salt water-immiscible solution containing a first reactive component required to form the shell wall and the salt water-immiscible material to form a dispersion; and adding, with agitation, to the dispersion, a second reactive component required to form the shell wall which reacts with the first reactive component to form the polycondensate shell wall about the salt water-immiscible material.

Surprisingly, it has now been found that the process of the present invention provides physically and chemically stable microcapsule compositions. The stability of the microcapsule compositions of this invention is achieved through the use of a salt or mixture of salts in the process used to prepare the compositions. The salt or mixture of salts decreases the aqueous solubility of the material to be encapsulated and, thereby, reduces the amount of non-encapsulated material present in the microcapsule compositions of the present invention. The reduction in the amount of non-encapsulated material present in the compositions of this invention is highly desirable because the potential for crystal growth is greatly reduced, and in many cases may be eliminated altogether.

Advantageously, the process of the present invention provides microcapsule compositions which may contain high concentrations of salt water-immiscible materials. It is known to add salt after the microcapsules are formed, ie. post-addition; the post-addition of salts increases the total volume of the compositions and, thereby, reduces the concentration of salt water-immiscible materials present in the compositions. Further it is known that the post-addition of certain salts, particularly magnesium sulfate and calcium chloride, is not practical because an exothermic hydration reaction occurs which significantly reduces the physical and chemical stability of microcapsule compositions. However the present process allows for the use of magnesium sulfate and calcium chloride. The art does not teach adding salt before the microcapsules are formed as in the present invention.

Salts suitable for use in the process of the present invention include alkali metal salts such as lithium chloride, sodium chloride, potassium chloride, lithium nitrate, sodium nitrate, potassium nitrate, lithium sulfate, sodium sulfate, potassium sulfate, sodium monohydrogen phosphate, potassium monohydrogen phosphate, sodium dihydrogen phosphate, potassium dihydrogen phosphate and the like; alkaline earth metal salts such as magnesium chloride, calcium chloride, magnesium nitrate, calcium nitrate, magnesium sulfate and the like; and ammonium salts such as ammonium chloride, ammonium sulfate, ammonium monohydrogen phosphate, ammonium dihydrogen phosphate and the like. Preferred salts for use in this invention include sodium chloride, potassium chloride, calcium chloride and magnesium sulfate, with magnesium sulfate being especially preferred.

Surprisingly, it has been found that stable microcapsule compositions may be prepared using a wide variety of emulsifiers. In particular, emulsifiers such as ethoxylated lignosulfonic acid salts, lignosulfonic acid salts, oxidized lignins, lignin salts, salts of styrene-maleic anhydride copolymers, salts of partial esters of styrene-maleic anhydride copolymers, partial salts of polyacrylic acid, partial salts of polyacrylic acid terpolymers and the like are suitable for use in the process of this invention. In the above described emulsifiers, sodium, potassium, magnesium, calcium and ammonium salts are generally preferred with sodium and magnesium salts being particularly preferred. Preferred emulsifiers for use in this invention include ethoxylated lignosulfonic acid salts, lignosulfonic acid salts and oxidized lignins, with ethoxylated lignosulfonic acid salts being more preferred, and the sodium salt of ethoxylated lignosulfonic acid being most preferred.

The aqueous solution of the present invention preferably contains about 5% to 30%, more preferably about 15% to 30%, by weight of the salt or mixture of salts. With less than 5% salt the benefits of the present invention are less apparent and with greater than 30% the risk of an oversaturated solution is increased. The aqueous solution also contains preferably about 0.5% to 5%, more preferably about 1% to 3%, by weight of the emulsifier or mixture of emulsifiers.

In general, any salt water-immiscible materials which have a melting point below about 65° C. or are soluble in a salt water-immiscible solvent and are compatible with the first reactive wall forming component may be encapsulated by the process of this invention. Accordingly, a greater variety of materials can be encapsulated by the process of the invention because the solubility of the material is generally lowered in the salt water of the present process. In particular, microcapsules containing a salt water-immiscible material such as an agricultural compound, a pharmaceutical compound, a dye, an ink, a flavoring agent and the like may be prepared by the process of this invention. The present invention is especially suitable for the preparation of microcapsules containing salt water-immiscible agricultural compounds such as herbicides, insecticides, acaricides, nematicides, fungicides, plant growth regulators, safeners, algicides, molluscicides, mildewicides, ectoparasiticides and the like.

The process of this invention is particularly suitable for the preparation of microcapsules containing herbicidal compounds and insecticidal compounds. Herbicidal compounds especially suitable for use in the present invention include dinitroaniline compounds such as pendimethalin and trifluralin, and haloacetanilide compounds such as alachlor, metolachlor and propachlor. Insecticidal compounds especially suitable for use in the present invention include phosphoric acid ester compounds such as terbufos, malathion, chlorpyrifos, diazinon and profenofos, and pyrethroid compounds such as cypermethrin, alpha-cypermethrin and permethrin.

The microcapsule compositions prepared by the process of the present invention preferably contain about 5% to 60%, more preferably about 20% to 50%, by weight of the salt water-immiscible material.

The salt water-immiscible solution is prepared by mixing the first reactive wall forming component with the salt water-immiscible material at a temperature above the melting point of the salt water-immiscible material. Alternatively, the salt water-immiscible solution may be prepared by mixing the first reactive wall forming component with a solution of the salt water-immiscible material in a suitable salt water-immiscible solvent.

Salt water-immiscible solvents which are suitable for use include solvents which do not react undesirably with any of the ingredients used in the invention process. Suitable solvents include salt water-immiscible hydrocarbons, aromatic hydrocarbons, chlorinated hydrocarbons, chlorinated aromatic hydrocarbons, ketones, long chain esters and mixtures thereof.

The polycondensate shell wall of the present invention may be any known shell wall material and is preferably a polyurea, a polyurethane, a polyamide, a polycarbonate or a polysulfonamide, with a polyurea shell wall being especially preferred. The polycondensate shell wall may be prepared from reactive components which are well known in the art. Preferably, the polycondensate shell wall is prepared by reacting a first reactive component selected from the group consisting of a polyisocyanate, a polyacid chloride, a polychloroformate and a polysulfonyl chloride with a complementary second reactive component selected from the group consisting of a polyamine and polyol to form the appropriate polycondensate shell wall. In a preferred process of the present invention, a polyisocyanate is reacted with a polyamine to form a polyurea shell wall.

Polyisocyanates which are suitable for use include di- and triisocyanates wherein the isocyanate groups are attached to an aliphatic or aromatic group. Suitable polyisocyanates include tetramethylene diisocyanate, pentamethylene diisocyanate, hexamethylene diisocyanate, toluene diisocyanate, diphenylmethene-4,4'-diisocyanate, polymethylene polyphenylene isocyanate, 2,4,4'-diphenyl ether triisocyanate, 3,3'-dimethyl-4,4'-diphenyl diisocyanate, 3,3'-dimethoxy-4,4'-diphenyl diisocyanate, 1,5-naphthylene diisocyanate, 4,4'4"-triphenylmethane triisocyanate and the like with polymethylene polyphenylene isocyanate being preferred.

Polyamines suitable for use in the process of the present invention include ethylenediamine, propylene-1,3-diamine, tetramethylenediamine, pentamethylenediamine, 1,6-hexamethylenediamine, diethylenetriamine, triethylenetetramine, tetraethylenepentamine, pentaethylenehexamine, 4,9-dioxadodecane-1, 12-diamine, 1,3-phenylenediamine, 2,4- and 2,6-toluenediamine, 4,4'-diaminodiphenylmethane and the like with 1,6-hexamethylenediamine being preferred. Hydrochloride salts of those polyamines may also be used in the process of the present invention.

Various shell wall thicknesses can be achieved in accordance with present invention. In general, wall thickness would be selected relative to the desired application for the microcapsule. The salt water-immiscible solution preferably contains about 1% to 15%, more preferably about 2% to 8%, by weight of the first reactive wall forming component. The second reactive wall forming component is preferably present in an amount of about 0.3% to 5%, more preferably about 0.6% to 3%, by weight relative to that of the salt water-immiscible solution.

The process of the invention is generally conducted at an elevated temperature to increase the solubility of the salt, to maintain the salt water-immiscible material in a liquid state, and to enhance the wall forming reaction rate. The process of the present invention is preferably conducted at a temperature of about 35° C. to 85° C. and is more preferably conducted at a temperature of about 50° C. to 65° C. The microcapsules prepared by the process of this invention preferably have a median diameter of about 3 micrometers to 50 micrometers and more preferably about 5 micrometers to 15 micrometers.

The present invention also relates to the microcapsules prepared by the process of the present invention. Advantageously, it has been found that during the process of the present invention, a small amount of salt water may be incorporated into the microcapsules. One of the benefits of incorporating a small amount of salt water into the microcapsules is that the rate of release of the microcapsule contents is increased upon dilution with water. That property may make the microcapsules of this invention especially useful for agricultural applications where rapid release is desired.

This invention further relates to a method for controlling pests such as weeds, insects, acarina, fungi, nematodes and the like by applying to the locus of the pest a pesticidally effective amount of a microencapsulated pesticide which is microencapsulated by the process of the present invention. In particular, this invention provides a method for controlling undesirable plant species which comprises applying to the foliage of the plants or to the soil or water containing seeds or other propagating organs thereof, a herbicidally effective amount of a microencapsulated herbicide which is microencapsulated by the process of the present invention.

The present invention also provides pesticidal compositions comprising an agronomically acceptable inert solid or liquid carrier and a pesticidally effective amount of a microencapsulated pesticide which is microencapsulated by the process of the present invention. Advantageously, the microcapsule compositions prepared by the process of this invention may be used directly as pesticidal compositions and are diluted with water for use. Alternatively, additional ingredients such as anti-settling agents, salts, antifoams, surfactants, pH-adjusters, anti-freeze agents and the like may be added to the microcapsule compositions prepared by the process of the present invention to form concentrated microcapsule pesticidal compositions. In particular, the present invention provides concentrated microcapsule herbicidal compositions which comprise about 90% to 99%, preferably about 95% to 99%, by weight of a microcapsule composition wherein the salt water-immiscible material is a herbicide; about 1% to 10%, preferably about 1% to 5%, by weight of an aqueous solution which contains about 1% to 5% by weight of a anti-settling agent, and up to about 0.5% by weight of an antifoam.

If desired, the microcapsules may be separated out of the microcapsule compositions prepared by the process of the present invention by methods known in the art such as filtration, to obtain storage-stable flowable powders.

One of the problems associated with the application of certain herbicidal compositions is that staining of non-target areas may occur. Staining is particularly troublesome when certain lawn and turf herbicidal formulations are applied because certain non-target areas such as vinyl siding and concrete are easily stained. In particular, certain dinitroaniline herbicides such as pendimethalin have caused undesirable staining. Advantageously, it has been found that staining problems associated with the use of commercially available formulations of herbicides such as pendimethalin are significantly reduced if not eliminated altogether when the herbicide is applied in the form of microcapsules which are prepared according to the process of this invention.

In order to facilitate a further understanding of the invention, the following examples are presented primarily for the purpose of illustrating more specific details thereof. The invention should not be deemed limited by the examples as the full scope of the invention is defined in the claims.

EXAMPLE 1

Preparation of microcapsule compositions

A mixture of sodium chloride (35 g), CYPRES®48 (4.25 g), and water (150 g) is heated to 60° C., and stirred to obtain an aqueous solution. A salt water-immiscible solution (previously prepared by heating a mixture of pendimethalin (140 g), and 1.73g of MONDUR®MRS (a 4,4'-diphenyl diisocyanate polymer manufactured by Mobay Corp., Pittsburgh, Pa.) to 60° C. is added to the aqueous solution with stirring to form an emulsion. Thereafter, the stirrer speed is reduced, and a solution of 1,6-hexamethylenediamine (HMDA, 0.6 g) in water (5.6 g) is added to the stirred emulsion and the resultant mixture is stirred for about 2 hours to form the microcapsule composition identified as composition number 1 in Table II.

Using essentially the same procedure, but using the ingredients listed in Table I, the microcapsule compositions identified as composition numbers 2–40 in Table II are obtained. When additional ingredients are used, they are added to the aqueous solution prior to the addition of the salt water-immiscible solution.

TABLE I

Herbicides
a. pendimethalin
b. trifluralin
Salts
c. sodium chloride
d. calcium chloride
e. potassium chloride
f. magnesium sulfate
g. sodium sulfate
Emulsifiers
h. CYPRES®48, sodium salt of a maleic anhydride copolymer, manufactured by CYTECH Industries Inc., West Patterson, N.J.
i. REAX®88B, sodium salt of lignosulfonic acid, manufactured by Westvaco, Charleston Heights, S.C.
j. INDULIN®C, sodium salt of lignin, manufactured by Westvaco, Charleston Heights, S.C.
k. REAX®825E 1.2 moles ethoxylation, the sodium salt of an ethoxylated lignosulfonic acid, manufactured by Westvaco, Charleston Heights, S.C.
l. REAX®825E 2.4 moles ethoxylation, the sodium salt of an ethoxylated lignosulfonic acid, manufactured by Westvaco, Charleston Heights, S.C.
m. REAX®825E 3.6 moles ethoxylation, the sodium salt of an ethoxylated lignosulfonic acid, manufactured by Westvaco, Charleston Heights, S.C.
n. LIGNOTECH®, a sodium salt of an oxidized Kraft lignin, manufactured by Lignotech (USA), Rothschild, Wis.
o. XSMA®15000; 1.5:1.0 styrene/maleic anhydride copolymer manufactured by Atochem Inc., Malvern, Pa.
p. XSMA®10000; 1.0:1.0 styrene/maleic anhydride copolymer manufactured by Atochem Inc., Malvern, Pa.
q. GOODRITE®K-732, mixture of sodium polyacrylate and polyacrylic acid, manufactured by BF Goodrich Co., Brecksville, Ohio.
r. GOODRITE®K-798, a partially neutralized acrylic terpolymer, manufactured by BF Goodrich Co., Brecksville, Ohio.
s. SMA®3000A 10% solution prepared from 338 g water, 40 g SMA®3000A (a styrene-maleic anhydride polymer, manufactured by Atochem Inc., Malvern, Pa.) and 29.8 g of a 50% sodium hydroxide solution.
Additional Ingredients
t. THIND®30, a silicone antifoam agent, manufactured by Harcros Chemicals Inc., Kansas City, Kans.
u. 10% HCl solution
v. 50% sodium hydroxide solution

TABLE II

Microcapsule Compositions

| Composition Number | Herbicide | Salt | Emulsifier | MONDUR® MRS | HMDA | Water | Other |
|---|---|---|---|---|---|---|---|
| 1 | a/41.52 | c/10.38 | h/1.26 | 0.51 | 0.18 | 46.15 | — |
| 2 | a/41.52 | c/10.38 | i/1.26 | 0.51 | 0.18 | 46.15 | — |
| 3 | a/39.09 | c/15.63 | h/1.19 | 0.48 | 0.17 | 43.44 | — |
| 4 | a/39.09 | c/15.63 | i/1.19 | 0.48 | 0.17 | 43.44 | — |
| 5 | a/41.52 | c/10.38 | j/1.26 | 0.51 | 0.18 | 46.15 | — |
| 6 | a/39.09 | c/15.63 | j/1.19 | 0.48 | 0.17 | 43.44 | — |
| 7 | a/41.52 | c/10.38 | k/1.26 | 0.51 | 0.18 | 46.15 | — |
| 8 | a/41.52 | c/10.38 | l/1.26 | 0.51 | 0.18 | 46.15 | — |
| 9 | a/41.52 | c/10.38 | m/1.26 | 0.51 | 0.18 | 46.15 | — |
| 10 | a/41.52 | c/10.38 | n/1.26 | 0.51 | 0.18 | 46.15 | — |
| 11 | a/41.52 | c/10.38 | o/1.26 | 0.51 | 0.18 | 46.15 | — |
| 12 | a/41.52 | c/10.38 | p/1.26 | 0.51 | 0.18 | 46.15 | — |
| 13 | a/41.52 | c/10.38 | q/1.26 | 0.51 | 0.18 | 46.15 | — |
| 14 | a/39.09 | d/15.63 | m/1.19 | 0.48 | 0.17 | 43.44 | — |
| 15 | a/40.33 | d/12.96 | m/1.22 | 0.50 | 0.17 | 44.82 | — |
| 16 | a/41.32 | c/10.33 | i/1.26 | 0.51 | 0.18 | 45.75 | u/0.64 |
| 17 | a/39.54 | e/14.12 | i/1.21 | 0.49 | 0.17 | 43.78 | u/0.69 |
| 18 | a/47.33 | d/8.79 | h/1.30 | 0.70 | 0.24 | 41.58 | t/0.06 |
| 19 | a/47.35 | d/8.80 | h/1.30 | 0.85 | 0.29 | 41.35 | t/0.06 |
| 20 | a/40.77 | f/9.72 | m/1.08 | 1.48 | 0.51 | 46.39 | t/0.06 |
| 21 | a/49.04 | f/8.36 | m/0.93 | 1.27 | 0.44 | 39.91 | t/0.05 |
| 22 | a/40.21 | c/10.05 | g/1.29 | 0.50 | *0.17 | 44.69 | u/2.11 v/0.98 |
| 23 | a/41.23 | c/10.31 | r/1.33 | 0.51 | 0.18 | 45.83 | u/0.20 v/0.42 |
| 24 | a/47.50 | d/12.26 | s/3.68 | 0.74 | 0.26 | 35.50 | t/0.06 |
| 25 | a/46.91 | d/11.94 | h/0.33 | 0.74 | 0.26 | 39.78 | t/0.05 |
| 26 | a/48.48 | g/8.98 | h/0.34 | 0.76 | 0.26 | 41.12 | t/0.06 |
| 27 | a/48.21 | c/9.49 | h/0.34 | 0.76 | 0.26 | 40.89 | t/0.06 |
| 28 | a/46.55 | f/11.85 | i/1.08 | 0.73 | 0.25 | 39.48 | t/0.05 |
| 29 | a/46.55 | d/11.85 | i/1.08 | 0.73 | 0.25 | 39.48 | t/0.05 |
| 30 | a/48.11 | g/8.91 | i/1.11 | 0.76 | 0.26 | 40.80 | t/0.06 |
| 31 | a/47.84 | c/9.41 | i/1.11 | 0.75 | 0.26 | 40.57 | t/0.06 |
| 32 | b/35.57 | c/11.32 | i/1.38 | 0.43 | 0.15 | 50.27 | u/0.88 |
| 33 | b/41.16 | c/10.29 | i/1.26 | 0.51 | 0.18 | 45.74 | u/0.87 |
| 34 | a/44.40 | f/8.63 | m/0.99 | 2.79 | 0.97 | 42.15 | t/0.06 |
| 35 | a/44.42 | f/8.48 | m/0.99 | 3.50 | 1.22 | 41.38 | t/0.01 |
| 36 | a/44.42 | f/9.85 | m/d.99 | 2.22 | 0.78 | 41.73 | t/0.01 |
| 37 | a/47.24 | c/9.29 | i/1.09 | 1.49 | 0.51 | 40.32 | t/0.05 |
| 38 | a/46.65 | c/9.18 | i/1.08 | 2.20 | 0.76 | 40.07 | t/0.05 |
| 39 | a/45.98 | f/11.71 | i/1.06 | 1.45 | 0.50 | 39.24 | t/0.05 |
| 40 | a/45.43 | f/11.57 | i/1.05 | 2.15 | 0.74 | 39.02 | t/0.05 |

EXAMPLE 2

Preparation of concentrated microcapsule compositions

Sodium chloride (21 g) and a 2% KELZAN®S (a xanthan gum anti-settling agent manufactured by Kelco, San Diego, Calif.) solution (12 g) are added to 337.2 g of composition number 1 (from Example 1) with stirring to form the concentrated microcapsule composition identified as composition number 41 in Table III.

Using essentially the same procedure, but using the appropriate microcapsule composition from Example 1 and adding the KELZAN®S solution alone or in combination with additional salt, the concentrated microcapsule compositions identified as composition numbers 42–48 in Table III are obtained.

TABLE III

Concentrated Microcapsule Compositions

| Comp. Number | Herbicide | Salt | Emulsifier | MONDUR® MRS | HMDA | Water | KELZAN® S | Other |
|---|---|---|---|---|---|---|---|---|
| 41 | a/37.82 | c/15.13 | h/1.15 | 0.47 | 0.16 | 45.21 | 0.06 | — |
| 42 | a/37.82 | c/15.13 | j/1.15 | 0.47 | 0.16 | 45.21 | 0.06 | — |
| 43 | a/37.82 | c/15.13 | j/1.15 | 0.47 | 0.16 | 45.21 | 0.06 | — |
| 44 | a/43.75 | f/8.50 | m/0.98 | 2.75 | 0.96 | 42.98 | 0.03 | t/0.06 |

TABLE III-continued

Concentrated Microcapsule Compositions

| Comp. Number | Herbicide | Salt | Emulsifier | MONDUR ® MRS | HMDA | Water | KELZAN ® S | Other |
|---|---|---|---|---|---|---|---|---|
| 45 | a/43.78 | f/8.36 | m/0.98 | 3.45 | 1.20 | 42.20 | 0.03 | t/0.01 |
| 46 | a/44.74 | c/10.36 | i/1.04 | 0.70 | 0.24 | 42.80 | 0.06 | t/0.05 |
| 47 | a/44.22 | a/10.24 | i/1.02 | 1.39 | 0.48 | 41.10 | 0.06 | t/0.05 |
| 48 | a/43.70 | c/10.12 | i/1.01 | 2.06 | 0.71 | 40.86 | 0.06 | t/0.05 |

EXAMPLE 3

Evaluation of staining properties of microcapsule compositions

This example demonstrates that pendimethalin containing microcapsule compositions of this invention cause significantly less staining when compared to PROWL®3.3EC, a commercial pendimethalin emulsifiable concentrate composition manufactured by American Cyanamid Company, Wayne, N.J. In the following tests, 3 drops of the appropriate test composition (about 507 L each) are placed on polyvinylchloride tape (SCOTCH® brand tape, core series 2-0300, 3M, St. Paul, Minn.) and allowed to dry. After standing at room temperature for one hour, the residues on the tape are rinsed with water. The stains left on the tape are then visually rated on a linear scale of 0 to 10 with 0 representing no staining and 10 representing 100% of the deep yellow stain caused by PROWL®3.3EC. The results are summarized in Table IV. Data in Table IV is reported by composition number given in Table II.

As can be seen from the data in Table IV, the microcapsule compositions of this invention are significantly less staining when compared to PROWL®3.3EC.

TABLE IV

Staining Evaluations

| Composition Number | Rating |
|---|---|
| 25 | <1 |
| 26 | 5–6 |
| 27 | <1 |
| 28 | 1 |
| 29 | 1 |
| 30 | 5 |
| 31 | 2 |
| 37 | 1 |
| 38 | <1 |
| 39 | 0 |
| 40 | 0 |
| PROWL ® 3.3EC | 10 |

EXAMPLE 4

Evaluation of crystal growth

This example demonstrates that crystal growth is significantly reduced when a salt or mixture of salts is used in the process for the preparation of microcapsule compositions. In the following test, samples of the appropriate microcapsule compositions (about 30 g) are poured into glass bottles and the bottles are placed in a test chamber. The samples are subjected to temperature cycles of 0°–40° C. and each cycle takes about 24 hours. After several weeks, the samples are removed and crystal growth is evaluated by optical microscopy. The results are summarized in Table V. Data in Table V is reported by composition number given in Table II. The control composition is prepared according to the procedure of Example 1, except that no salt is used.

Control Composition

| Ingredient | wt/wt % |
|---|---|
| Pendimethalin | 45.86 |
| REAX ® 88B | 1.40 |
| MONDUR ® MRS | 0.57 |
| HMDA | 0.29 |
| 10% Hydrochloric Acid | 0.81 |
| Water | 51.07 |

TABLE V

Crystal Growth Evaluation

| Composition Number | Cycle Time (weeks) | Crystal Growth Observation |
|---|---|---|
| 16 | 3 | some small crystals |
| 28 | 9 | no crystals |
| 39 | 9 | no crystals |
| 40 | 9 | no crystals |
| Control | 3 | many large crystals |

What is claimed is:

1. A process for the preparation of a microcapsule composition which comprises:

(a) providing an aqueous solution containing (i) a salt or mixture of salts and (ii) an emulsifier or mixture of emulsifiers; wherein the salt or mixture of salts is selected from the group consisting of lithium chloride, sodium chloride, potassium chloride, ammonium chloride, magnesium chloride, calcium chloride, lithium nitrate, sodium nitrate, potassium nitrate, magnesium nitrate, calcium nitrate, lithium sulfate, sodium sulfate, potassium sulfate, ammonium sulfate, magnesium sulfate, sodium monohydrogen phosphate, potassium monohydrogen phosphate, ammonium monohydrogen phosphate, sodium dihydrogen phosphate, potassium dihydrogen phosphate, ammonium dihydrogen phosphate and mixtures thereof;

(b) dispersing, with agitation, in the aqueous solution, a salt water-immiscible solution containing a first reactive wall forming component selected from the group consisting of a polyisocyanate, a polyacid chloride, a polychloroformate and a polysulfonylchloride; and a salt water-immiscible material selected from the group consisting of a salt water-immiscible agricultural compound, pharmaceutical compound, dye, ink, and flavoring agent to form a dispersion; and (c) adding, with agitation, to the dispersion of step (b), a second reactive wall forming component selected from the group consisting of a polyamine and polyol which reacts with the first reactive wall forming component to form a polycondensate shell wall about the salt water-immiscible material.

2. A pesticidal composition which comprises an agronomically acceptable carrier and a pesticidally effective amount of a microencapsulated pesticide which is microencapsulated by the process of claim 1.

3. The process according to claim 1 wherein the salt is selected from the group consisting of sodium chloride, potassium chloride, calcium chloride and magnesium sulfate.

4. The process according to claim 3 wherein the salt is magnesium sulfate.

5. The process according to claim 1 wherein the aqueous solution contains about 5% to 30% by weight of the salt or mixture of salts.

6. The process according to claim 1 wherein the salt water-immiscible material is an agricultural product.

7. The process according to claim 6 wherein the agricultural product is selected from the group consisting of a herbicide and an insecticide.

8. The process according to claim 7 wherein the herbicide is selected from the grou consisting of a dinitroaniline compound and an acetanilide compound, and the insecticide is selected from the group consisting of a phosphoric acid ester compound and a pyrethroid compound.

9. The process according to claim 8 wherein the dinitraniline compound is selected from the group consisting of pendimethalin and trifluralin, the acetanilide compound is selected from the group consisting of alachlor and metolachlor, the phosphoric acid ester compound is selected from the group consisting of terbufos, malathion and chlorpyrifos, and the pyrethroid compound is selected from the group consisting of cypermethrin, alpha-cypermethrin and permethrin.

10. The process according to claim 9 wherein the dinitroaniline compound is pendimethalin.

11. The process according to claim 1 wherein the aqueous solution contains about 0.5% to 5% by weight of the emulsifier or mixture of emulsifiers.

12. The process according to claim 1 wherein the first reactive wall forming component is a polyisocyanate.

13. The process according to claim 12 wherein the polyisocyanate is a polymethylene polyphenylene isocyanate.

14. The process according to claim 1 wherein the salt water-immiscible solution contains about 1% to 15% by weight of the first reactive component.

15. The process according to claim 1 wherein the second reactive wall forming component is a polyamine.

16. The process according to claim 15 wherein the polyamine is 1,6-hexamethylenediamine.

17. The process according to claim 1 wherein the second reactive component is present in an amount of about 0.3% to 5% by weight relative to that of the salt water-immiscible solution.

18. The process according to claim 1 wherein the median diameter of the microcapsules is about 3 micrometers to 50 micrometers.

19. The process according to claim 18 wherein the median diameter of the microcapsules is about 5 micrometers to 15 micrometers.

20. The process according to claim 1 wherein the process is conducted at a temperature of about 35° C. to 85° C.

21. A microcapsule comprising a salt water-immiscible material within a shell wall of a polycondensate which is prepared by the process of claim 1.

22. A method for controlling a pest which comprises applying to the locus of the pest a pesticidally effective amount of a microencapsulated pesticide which is microencapsulated by the process of claim 1.

* * * * *